Patented Nov. 9, 1943

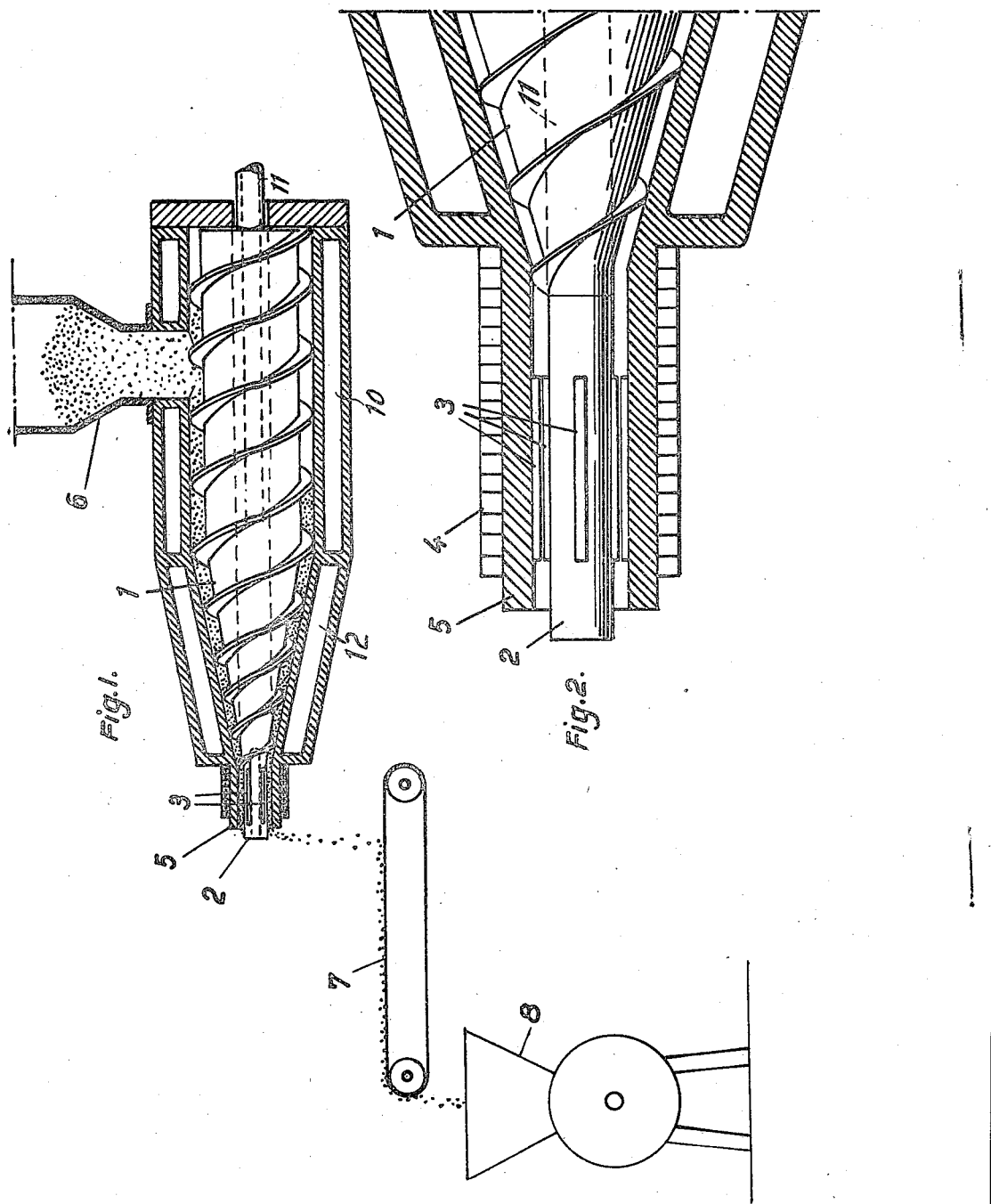

2,333,786

UNITED STATES PATENT OFFICE 2,333,786

PROCESS FOR THE PRODUCTION OF
MOLDING MIXTURES

Richard Hessen, Bautzen, Germany; vested in
the Alien Property Custodian

Application February 10, 1941, Serial No. 378,140
In Germany January 18, 1939

2 Claims. (Cl. 260—37)

The invention relates to a process for the production of press-mixtures particularly those containing hardenable synthetic resins, for example products of condensation of phenolformaldehyde.

For the production of press-mixtures, i. e., impregnated mixtures of synthetic substances, particularly hardenable synthetic substances such as products of condensation of phenolformaldehyde and filling substances as, e. g., wood meal and occasionally additional substances such as pigments, lubricants, catalyzers and the like, four different kinds of apparatus have been proposed, to wit, mixing devices in which the filling substances are impregnated with solutions of resin, heated kneading apparatus, heated mixing rollers and heated mixing nozzles.

The first-mentioned apparatus is disadvantageous in that it requires, subsequent to the impregnation of the filling substance with solutions of resin, a cumbrous and difficultly controllable drying process in a vacuum or in ordinary drying kilns. This involves the risk of attaining the hardened condition of the resins before the solvent has been completely eliminated.

On the other hand, heated kneading apparatus and heated mixing rollers have the advantage that their operation does not require the use of a solvent, but even these apparatus, like the first-mentioned one, permit of discontinuous operation only, that is to say, they can only be worked with separate charges, which has the disadvantage that such charges can never be completely uniform.

When using heated kneading apparatus, moreover, the kneading pressure is comparatively low on account of the yielding of the mass rendered plastic by heat. The water of condensation and the volatile substances cannot escape, so that the kneaded mass has usually to be subjected to an additional rolling process. Besides, such apparatus can only be operated at comparatively low temperatures as otherwise the material contacting the heated surfaces of the kneader may pass into the final condition before the remaining portions of the mass are impregnated. As a result of the use of comparatively low temperatures the process, therefore, takes much time and is disadvantageous in that resins employed, at these temperatures, are not in the best condition for impregnating purposes.

Even the most frequently used apparatus, to wit: the heated mixing-roller, has the disadvantage that it permits of intermittent, i. e., batch, operation only.

In that case solid resins are also used and the temperature may lie higher. There also occurs elimination of water during the impregnation process.

The use of this apparatus, however, has the disadvantage that during the rotation of the kneading rollers, the kneading process can take place along the line of contact of such rollers only and the pressures, which may thus be attained along such line of contact, are very low on account of the yielding of the plastic material. The individual particles of the mass, when using such apparatus, during the greatest portion of the time lie in unmixed condtion one beside the other and only at one moment during a revolution of the rollers, will mixing take place. During the remaining time the mass is heated in unmixed condition to high temperatures and proceeds to condense in so far as the particles are in contact with the surfaces of the rollers. The remaining particles, insulated by the mass itself from the roller surface, are subjected to heat to a lesser degree, so that as the rolling process lasts a few minutes only, the mass, as eventually obtained, will contain unevenly condensed particles.

As previously stated, all these prior apparatus have the disadvantage that they permit of discontinuous operation only. They, moreover, require comparatively much manual labour, whilst particularly in the case of kneading apparatus, the difficulty arises that during the cooling of the charges containing hardenable resins, the reaction continues even after the termination of the mixing process, i. e., during the slow cooling, thereby increasing the unevenness of the individual charges still further.

A further known device, the mixing nozzle (German patent specifications No. 616,178 and No. 635,227) as compared with the apparatus thus far described, has the advantage that it permits of continuous operation.

In that case comparatively high temperatures are permissible, but the capacities when using narrow mixing slots are small, whereas when using wider slots the mixing operation inter alia leaves much to be desired.

According to the present invention a novel process is proposed which runs continuously and automatically and guarantees a perfectly even and very thorough and uniform mixing or impregnation, at the same time permitting the use of comparatively high temperatures at which the resin is fluid or thinly liquid without there being any risk of undesired hardening.

According to the present invention resins and filling substances in preheated, compressed condition are laterally fed to an annular space formed between a roller and a casing or shell surrounding same. Casing and roller rotate relatively, i. e., both elements may rotate or one of them, say the casing, may be stationary. Within this annular space the mass of resin and filling substance and occasionally additional substances, is mixed and impregnated whilst being heated, the mixture being subsequently discharged from said space in lateral direction.

It is of considerable advantage to combine the preheating and compressing operation with the mixing or impregnating process itself, in one and the same device, by feeding the resin and filling substance by means of a worm-screw which is preferably connected to the roller and by which the preheating and compression takes place.

In the case of the process according to the invention there is effected within the annular space a very thorough mixing or impregnation at the high temperature prevailing therein, due to the mass passing through this space along a helical path. There also occurs a considerable friction further advancing the thorough mixing or impregnation of the mass fed into said space in preheated and compressed condition.

The path to be traversed by the mass may still be lengthened and the mixing still further improved by providing the inner or outer element or both elements with ribs or grooves extending in axial direction, although not necessarily over the entire length of said rollers. Such ribs or grooves may also be arranged at an angle with the axis of the element or elements, however, not at an angle of 90°. By providing such ribs or grooves the passage to be traversed by the mass takes the form of a flat spiral whereby its length is increased, thus improving the mixing and impregnating process.

In its simplest form the process according to the invention may be carried into effect by using a roller surrounded by a concentrically arranged stationary shell or casing. Both this casing and roller are heated and may be provided with ribs or grooves. The annular space between said roller and shell being continuously supplied from one side with the mass to be treated, there is no risk of the mass being caked by the rotation of the roller but on the other hand a thorough mixing is effected.

Such device is preferably connected to a pressure-wormscrew for feeding the material towards the annular space, means being preferably provided for preheating and compressing the mass during such feed. The pressure-screw is preferably cooled at its loading end and is heated at the remaining parts, whilst in addition thereto the walls surrounding such screw may be heated. This feed screw is preferably connected to the rotating roller and at this location a particularly high temperature is produced, e. g., by internal heating of the roller and additional electrical heating of the casing or shell which is preferably formed integral with the casing of the feed screw.

The annular space between the inner roller and the casing or shell need not have cylindrical faces, but may be contracted or enlarged towards the discharge end, e. g., by conical formation of the inner surface of the casing and cylindrical or conical formation of the roller. Alternatively the casing may be cylindrical and the roller conical.

The apparatus may also be constructed so that rollers of different profiles may be readily inserted therein. For example a shaft may be provided on which hollow rollers of varying diameters, varying cross-sectional shapes or formed with differently shaped surfaces may be placed. It is also possible to obtain the same interchangeability for the casing or shell by inserting differently shaped rings into a holding member.

As compared with the known mixing roller the advantage is obtained that the pressure of the two co-operating surfaces, upon the mass enclosed therebetween, is not exerted along a line only, but practically over the entire circumference, i. e., during the entire revolution of the element or elements. Moreover, the advantage is obtained that the mass may be heated to comparatively high temperatures so that, e. g., synthetic resin may be converted to fluid state, thereby greatly facilitating the impregnation of the filling substances. Each particle of the mass within the annular space of the apparatus according to the invention, is subjected to a long lasting high pressure, accompanied with large relative movement of the individual particles for as long as the mass remains within the mixing space. This duration may be exactly controlled and remains unaltered during the operation of the device so that the risk of unevenness of the mixture does not exist.

As stated above, in the case of hardenable resins a process of condensation takes place during the heating, at which volatile substances, such as, e. g., water and ammonia are liberated. These substances remain within the mass as long as same is under the pressure within the annular space. They escape at the same time that the mass, while expanding, leaves the annular space. This sudden evaporation is frequently of advantage, in that it effects a comparatively rapid cooling of the hot mass.

Moreover the advantage is obtained that not only a continuous but also an automatic operation is rendered possible. The initial mixture may be fed continuously, whilst the finished mixture may be collected on a conveyor device whereby it is conveyed, e. g., to a grinding apparatus so that contrary to the hitherto known process, the process according to the invention does not require any supervision.

The invention will be hereinafter described with reference to the accompanying drawing.

Fig. 1 shows a sectional view of the device for carrying into effect the process according to the invention.

Fig. 2 shows on an enlarged scale an essential portion of the device shown in Fig. 1.

The annular space is formed by the heated rotating roller 2 and the heated shell 5 surrounding same. Both the roller and the shell are provided with ribs 3. The heating of the shell is effected by means of an electric heating device 4.

To this annular space between the roller 2 and the shell 5, resin and filling substance in preheated compressed condition are fed laterally (from the right) by a pressure-wormscrew 1, which conveys the rough mixture supplied by the funnel 6, to the mixing device, at the same time compressing such mass on account of the formation of the threads of the feed screw. As the wall of the space containing such feed screw is heated, the material will also be heated. At the inlet end the screw is cooled by a water jacket 10. The feed screw is connected to the roller 2 and rotates therewith, whereas the shell 5 surrounding such roller is integrally formed with the wall enclosing the screw. The mixed or impregnated material which leaves the annular pressure space in lateral direction (to the left), and in which the resin is not yet in hardened condition, is collected on a conveyor band 7 and conveyed thereby to a grinding device 8. The rotation of the roller 2 may also be rendered independent of the rotation of the feed screw, e. g., by driving a movable shaft 11 passing through the feed screw so as to impart to the roller 2 a movement independent of that of the screw.

What I claim is:

1. A process for the continuous production of press-mixtures from heat-hardenable synthetic resins and filling substances, which comprises subjecting a mass of rough mixture of the resin and filling substance to an increasing pressure while continuously advancing it in the form of an annulus of decreasing cross-sectional area and while effecting relative movements of parts of the mass whereby to produce a substantial uniformity thereof, cooling the inner surface of the annulus during the initial compression of the mass, passing the mass in thin tubular form through a heating and compression zone under pressure and while continuously effecting relative movement of particles of the compressed mass, heating both inner and outer surfaces of the tubular mass for causing plasticizing of the resin and its impregnation into the filling substance, and discharging the press-mixture from the heating and compression zone prior to essential heat-hardening of the resin.

2. A process for the continuous production of press-mixtures from heat-hardenable synthetic resins and filling substances, which comprises subjecting a mass of rough mixture of the resin and filling substance to an increasing pressure while continuously advancing it in the form of an annulus of decreasing cross-sectional area and while effecting relative movements of particles of the mass whereby to produce a substantial uniformity thereof, passing the mass through a heating and compression zone in thin tubular form under pressure and while continuously effecting relative movement of parts of the compressed mass, heating both inner and outer surfaces of the tubular mass for causing plasticizing of the resin and its impregnation into the filling substance and thereby developing products which are volatile at atmospheric pressure but are retained in the mass under the existing pressure, and quickly discharging the press-mixture from the heating and compression zone prior to essential heat-hardening of the resin and thereby effecting evaporation of the volatile products and expansion of the mass for rapidly cooling the same below the temperature of heat-hardening.

RICHARD HESSEN.